(12) United States Patent
Meyer et al.

(10) Patent No.: US 8,016,438 B2
(45) Date of Patent: Sep. 13, 2011

(54) SPHERICAL MIRROR MOUNT

(75) Inventors: Jay L. Meyer, Long Beach, CA (US);
Glenn C. Messick, Rancho Palos Verdes, CA (US); Carl A. Nardell, Boston, MA (US); Martin J. Hendlin, Goleta, CA (US)

(73) Assignee: Raytheon Company, Waltham, MA (US)

( * ) Notice: Subject to any disclaimer, the term of this patent is extended or adjusted under 35 U.S.C. 154(b) by 50 days.

(21) Appl. No.: 12/236,256

(22) Filed: Sep. 23, 2008

(65) Prior Publication Data
US 2010/0073793 A1 Mar. 25, 2010

(51) Int. Cl.
G02B 5/08 (2006.01)
G02B 7/198 (2006.01)

(52) U.S. Cl. ......... 359/872; 248/481; 248/487; 359/876

(58) Field of Classification Search .................. 359/871, 359/872, 876; 248/481, 487
See application file for complete search history.

(56) References Cited

U.S. PATENT DOCUMENTS

| | | | | | |
|---|---|---|---|---|---|
| 3,517,904 | A | * | 6/1970 | Verchain | 248/324 |
| 3,588,025 | A | * | 6/1971 | Gersman | 248/451 |
| 3,642,353 | A | * | 2/1972 | Field | 359/874 |
| 4,088,396 | A | * | 5/1978 | Edelstein | 359/822 |
| 4,655,548 | A | * | 4/1987 | Jue | 348/373 |
| 4,925,286 | A | * | 5/1990 | Cutburth | 359/872 |
| 5,946,127 | A | * | 8/1999 | Nagata | 359/280 |
| 6,198,580 | B1 | * | 3/2001 | Dallakian | 359/822 |
| 6,384,993 | B1 | * | 5/2002 | Bell et al. | 359/896 |
| 6,663,247 | B1 | * | 12/2003 | Uno et al. | 359/874 |
| 7,090,362 | B2 | * | 8/2006 | Holderer et al. | 359/851 |
| 2002/0036764 | A1 | | 3/2002 | Osawa et al. | |
| 2005/0030653 | A1 | * | 2/2005 | Holderer et al. | 359/872 |
| 2008/0180819 | A1 | | 7/2008 | Wang | |

FOREIGN PATENT DOCUMENTS

| | | | |
|---|---|---|---|
| DE | 2363765 A | * | 6/1975 |
| DE | 202 12 115 U1 | | 12/2003 |
| JP | 07199038 A | * | 8/1995 |
| WO | 2006102908 A1 | | 10/2006 |

OTHER PUBLICATIONS

None, "Raytheon Reaches Key Milestone on NASA Glory Space Program," www.spacemart.com/reports, May 14, 2008, 3 pp.
None, Aerosol Polarimetry Sensor (APS), http://glory.gsfc.nasa.gov/overview-aps.html, accessed from Internet Aug. 4, 2008, 3 pp.
Cairns, Brian, "Aerosol Polarimetry Sensor", Powerpoint presentation, Glory Science Advisory Team Meeting, Jan. 17, 2006, Iasp.colorado.edu/glory/meetings/2006/presentations/Day1/05-Cairns.pdf, 32 pp.
International Search Report and Written Opinion for International Application No. PCT/US2009/051531 dated Oct. 1, 2009.

* cited by examiner

Primary Examiner — Mark Consilvio
(74) Attorney, Agent, or Firm — Pillsbury Winthrop Shaw Pittman LLP

(57) ABSTRACT

A spherical mounting assembly for mounting an optical element allows for rotational motion of an optical surface of the optical element only. In that regard, an optical surface of the optical element does not translate in any of the three perpendicular translational axes. More importantly, the assembly provides adjustment that may be independently controlled for each of the three mutually perpendicular rotational axes.

20 Claims, 6 Drawing Sheets

SPHERICAL MIRROR MOUNT

GOVERNMENT RIGHTS

This invention was made under NASA Contract No. NNG04HZ06C-NASA-GSFC. The Government may have certain rights in this invention.

BACKGROUND

This disclosure relates generally to the mounting of optical components, and in particular to the adjustable mounting of optical components.

Mounting optical components for aerospace applications requires many mechanical constraints, such as, for example, adjustability, overall size, and simplicity. Typical miniature commercial mirror mounts have their center of rotation located off the optical surface. As a result, when adjustment is made there is angular movement and translation of the reflected light. The axis of each adjustment is not independent in conventional kinematic mounts. A gimbal mount is also known. However, it has the problems due to its complexity and overall size.

SUMMARY

In accordance with one or more embodiments, a spherical mount assembly for mounting an optical element is provided, comprising: a spherical element; an optical element positioned relative to the spherical element, wherein an optical surface of the optical element is positioned to coincide with the center of rotation of the spherical element; a first retainer; and a second retainer including a mounting surface, wherein the first retainer and the second retainer are configured to hold the spherical element captive.

In accordance with other embodiments, an alignment system for a spherical mount assembly is provided, comprising: a stem for cooperating with the spherical element of the spherical mount assembly; an alignment stage for generating translation motion; and a coupling for rotationally coupling the translation stage to the stem without transferring translational motion to the spherical mount assembly.

In accordance with further embodiments, an alignment method for the spherical mount assembly is provided, comprising: locating the spherical mount assembly in the housing; providing a translational motion; converting the translation motion into a rotational motion; and transferring only the rotational motion to the spherical element of the spherical mount assembly.

These and features, and characteristics of as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various Figures. It is to be expressly understood, however, that the drawings are for the purpose of illustration and description only and are not intended as a definition of the limits of the inventive concept. As used in the specification and in the claims, the singular form of "a", "an", and "the" include plural referents unless the context clearly dictates otherwise.

BRIEF DESCRIPTION OF THE DRAWINGS

FIG. 1 is a front perspective view of the assembly;

FIG. 2 is a rear perspective view of the assembly;

FIG. 3 is an exploded view of assembly shown in FIG. 2.

DETAILED DESCRIPTION

Figure 1:
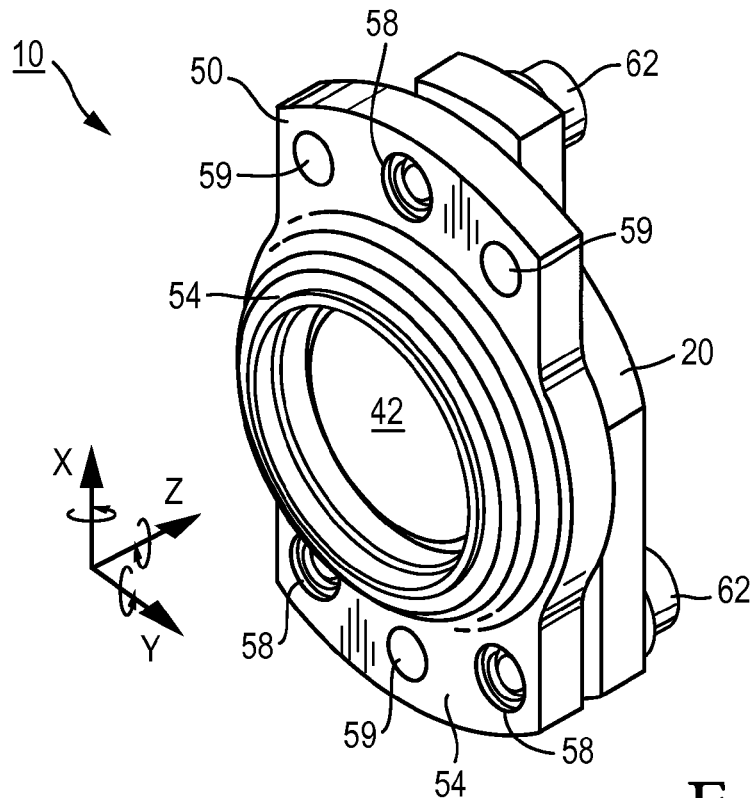
FIGS. 1-3 show a spherical mounting assembly for an optical element, according to one or more embodiments, where.
Figure 2:
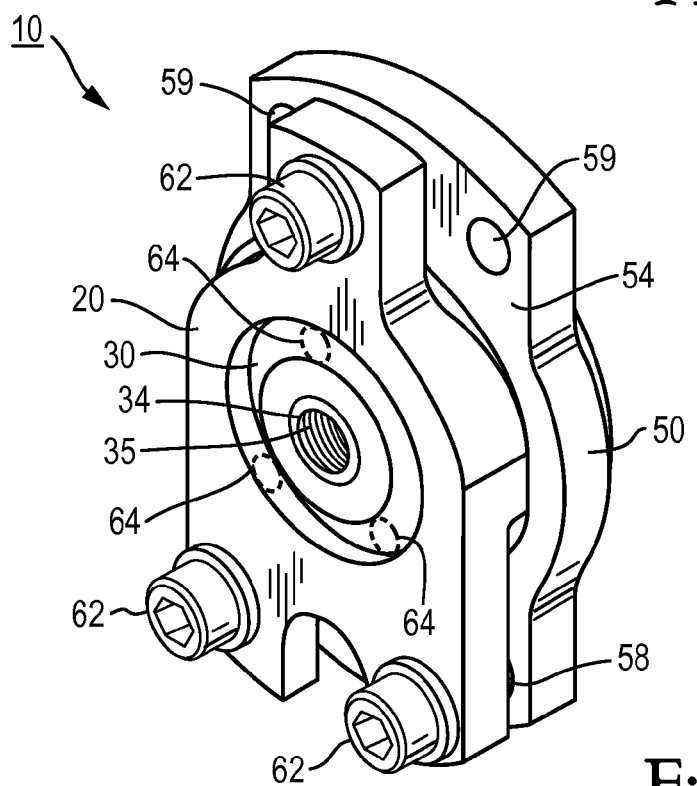
Figure 3:
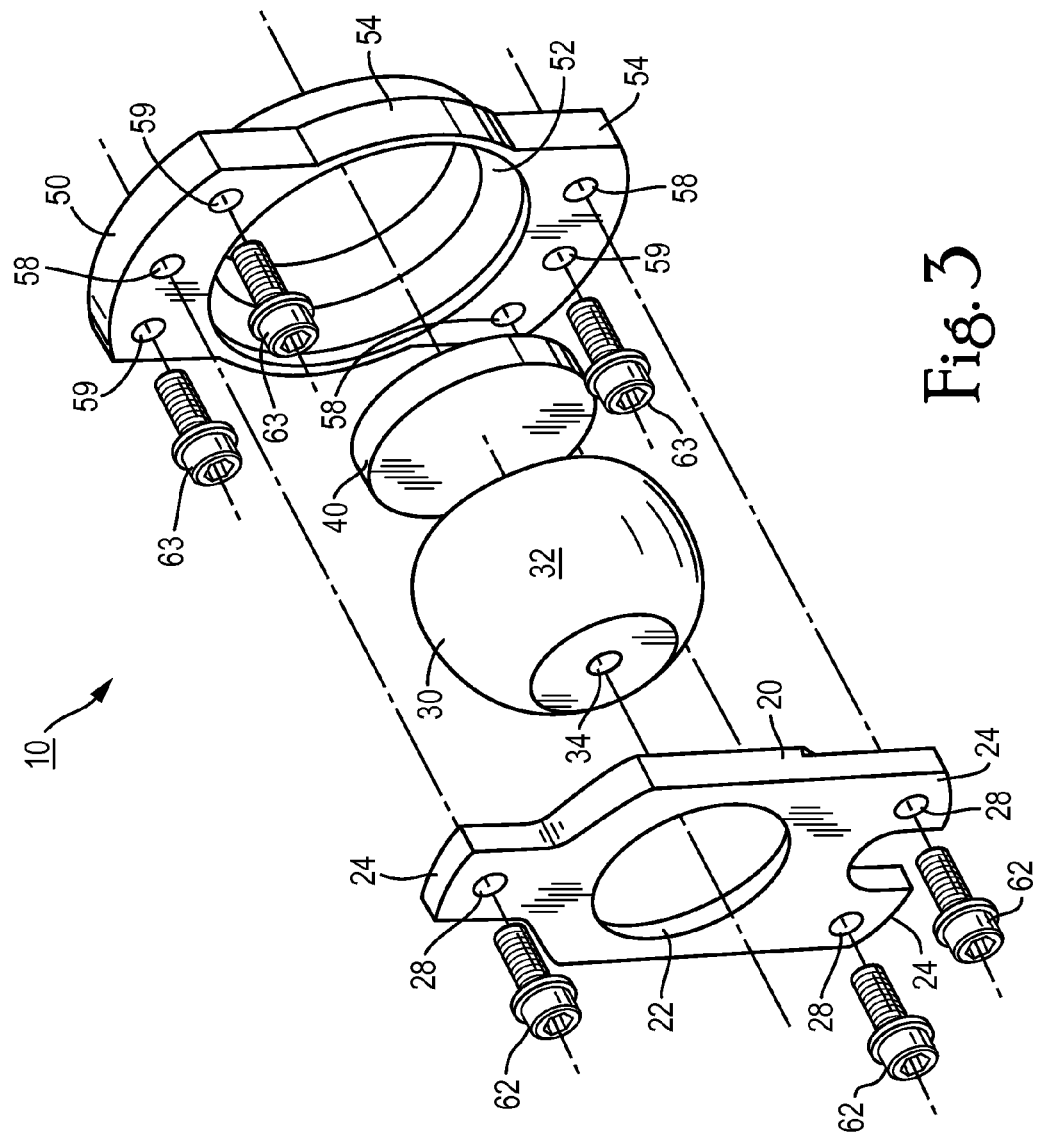

FIG. 1-3 show a spherical mounting assembly 10 for an optical element, according to an embodiment. FIG. 1 is a front perspective view of the assembly 10. FIG. 2 is a rear perspective view of the assembly 10. FIG. 3 is an exploded view of assembly 10 shown in FIG. 2.

The six degrees of freedom (6-DoF) of three-dimensional space are also shown as a reference. These generally include the three perpendicular translational axes, X (up/down), Y (forward/backward) and Z (left/right); and the three perpendicular rotational axes: $R_X$ (pitch), $R_y$ (yaw), and $R_Z$ (roll). While a Cartesian coordinate system is shown, it will be appreciated that a spherical coordinate system may similarly be used.

Spherical mounting assembly 10 generally includes four main components: first retainer 20, spherical element 30, optical element 40, and second retainer 50.

First retainer 20 and second retainer 50, when assembled, hold spherical element 30 captive and limit its relative movement. In one implementation, the overall size of the assembly 10 may be approximately 0.60 in. wide, 1.10 in. tall by 0.34 in. thick (not including mounting fasteners).

Spherical element 30 may include partially truncated spherical surface 32. Mounting surface 36 is provided to mount optical element 40. In some implementations, spherical element 30 may include a recessed portion 38 (FIG. 5) to accommodate optical element 40. Spherical element 30 may include bore 34 for cooperating with an adjustment system (FIG. 6) for adjusting the position of the spherical mount relative to the first and second retainers. Bore 34 may include threads 35. In some implementations, bore 34 may pass completely through the spherical element to permit light to pass through the spherical element 30.

Optical element 40 may be a mirror. Optical surface 42 of the mirror element may be a flat, concave, or convex. In accordance with other embodiments, various other optical elements may also be mounted in accordance with the inventive concept. These may include lenses, optical filters, polarizers, gratings, and/or collimated illuminations sources, such as lasers or light emitting diodes (LEDs).

Optical element 40 may be mounted to spherical element 30, for example, by a suitable adhesive. Other mounting arrangements are also possible, such as gaskets, press-fits, fasteners, etc.

First retainer 20 includes partially tapered surface 22 for cooperating with spherical surface 32 of element 30. Tapered surface 22 is configured to make contact with spherical surface 32 of spherical element 30. First retainer 20 may also include a plurality of bosses 24 which include holes 28 positioned around the surface thereof for accommodating a plurality of fasteners 62. The plurality of fasteners 62 secure first retainer 20 to second retainer 50 and provide a uniform clamping force to hold spherical element 30 therebetween. Fasteners 62 may include bolts and washers.

Similarly, second retainer 50 may include partially tapered surface 52 for cooperating with spherical element 30. Second retainer 50 includes a generally flat mounting surface 54 for mounting assembly 10 to an external structure, such as a housing. Second retainer 50 includes a plurality of holes 58 for accommodating mounting fasteners 62 for securing first retainer 20. In one implementation, holes 58 may be threaded.

Spherical element 30 may be formed of a material, such as, aluminum (or alloys thereof) or a bronze alloy. In one implementation, a zinc-free bronze alloy may also be used. It will be appreciated that other load-bearing materials may be used.

First and second retainers 20, 40 may be formed of a harder material than that of spherical element 30, such as iron or steel alloys, including stainless steel. It will appreciated that engineering plastics, such as Dupont Delrin® brand Polyoxymethylene and nylon, and other materials, such as titanium (and alloys thereof) may also be used for certain applications.

Assembly 10 allows for rotational motion of an optical surface of the optical element only. In that regard, optical surface 42 of optical element 40 does not translate along any of the three perpendicular translational axes. More importantly, assembly 10 provides adjustment that may be independently controlled for each of the three perpendicular rotational axes.

To align optical element 40 positioned on spherical element 30, fasteners 62 may be loosened such that spherical element 40 can rotate relative to first retainer 20 and second retainer 50. When alignment of optical element 40 is complete, fasteners 62 may be tightened such that tapered surfaces 22, 52 of first and second retainers 20, 50 are urged against spherical element 30 to clamp spherical element 30 and fix its position relative to assembly 10. A slight pre-load (torque) on fasteners 62 may ensure proper clamping. In addition, fasteners 63 may be staked or provided by adhesive (e.g., Loctite® brand adhesive) to permanently secure assembly 10. For example, first retainer 20 may be staked (for example, with an adhesive or with a punch or other tool) at locations 64 to permanently fix the position of spherical element 30.

The radii of tapered surfaces 22, 52 of first and second retainers 20, 50 may have radii that are substantially equal to that of spherical element 30. The tapered surface may be generally circular, conforming to the curvature of spherical element 30. In one implementation, tapered surfaces 22, 52 may be partially flat and/or conical. This may better accommodate manufacturing tolerance and "play" between the various elements of assembly 10. In other implementations, the tapered surface may be complementary to spherical surface 52.

Second retainer 50 may also be provided with circular projection 54 generally surrounding the outer surface of optical element 40. Projection 54 may help to locate assembly 10 in the housing and may prevent damage to the optical element by maintaining a recessed surface for optical element 40.

Moreover, second retainer 50 may include a plurality of holes 59 for accommodating additional mounting fasteners 63 for attaching assembly 10 to the external housing.

Figure 4:
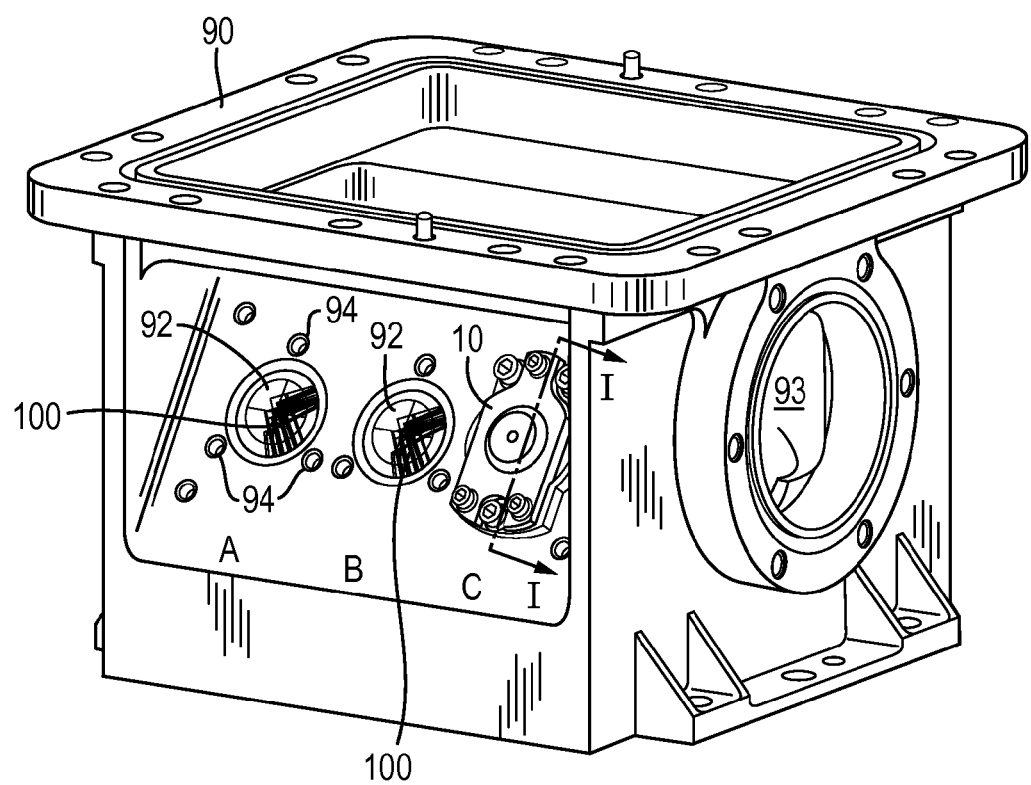
FIG. 4 shows the spherical mount assembly mounted in a housing, according to an embodiment.

Fasteners 63 secure second retainer 50 of assembly 10 to the external structure. Fasteners 63 may include bolts and washers. In other implementations, second retainer 50 may be integral with an external mounting structure, such as housing 90 (FIG. 4). It will be appreciated that other attachments means, such as adhesives, welding, brazing, etc. for attaching assembly 10 to the housing are also possible. Once assembly 10 is mounted, fasteners 63 may be staked or provided with an adhesive (e.g., Loctite® brand adhesive) to secure retainer 50 to the external structure.

FIG. 4 shows spherical mount assembly 10 mounted in a housing 90, according to an embodiment.

In an embodiment, housing 90 may be a dewar housing, such as the one provide in the Aerosol Polarimetry Sensor (APS) Instrument mounted in NASA's Glory low Earth orbit (LEO) scientific research satellite. The APS is configured to measure air pollutants and/or aerosols in the earth's atmosphere. In orbit, the sensor will take measurements of air samples in the earth's atmosphere at wavelengths from visible to short-wave infrared to analyze and determine their anthropogenic (man-made) or natural origin.

Six spherical mount assemblies 10 may be mounted at various positions A, B, C, etc. on the outside of housing 90—three on each side (although only one assembly 10 is shown being mounted at location C). Apertures 92 provide optical access from interior 93 of the housing to assembly 10 mounted on the outer surface thereof. A plurality of mounting holes 94 may be provided in the housing for accommodating fasteners 63 for securing assembly 10 to housing 90.

Additional mounting holes (shown in the Figure) may be provided for mounting other components and/or for connecting housing 90 to other elements.

A plurality of beams of light 100 are provided from one or more illumination sources (not shown). Each of the beams of light 100 is generally directly toward optical element 40 of a respective assembly 10 within interior 93 of the housing. In some implementations, more than one beam of light 100 may be directed toward each assembly 10.

In the case in which optical elements 40 are mirrors, beams of light 100' reflected therefrom are generally directed toward measurement detectors within housing 90. Incoming light 100 is reflected by the optical element 40 according to the laws of reflection. Different optical elements 40 may have different reflective and/or optical properties.

Figure 5:
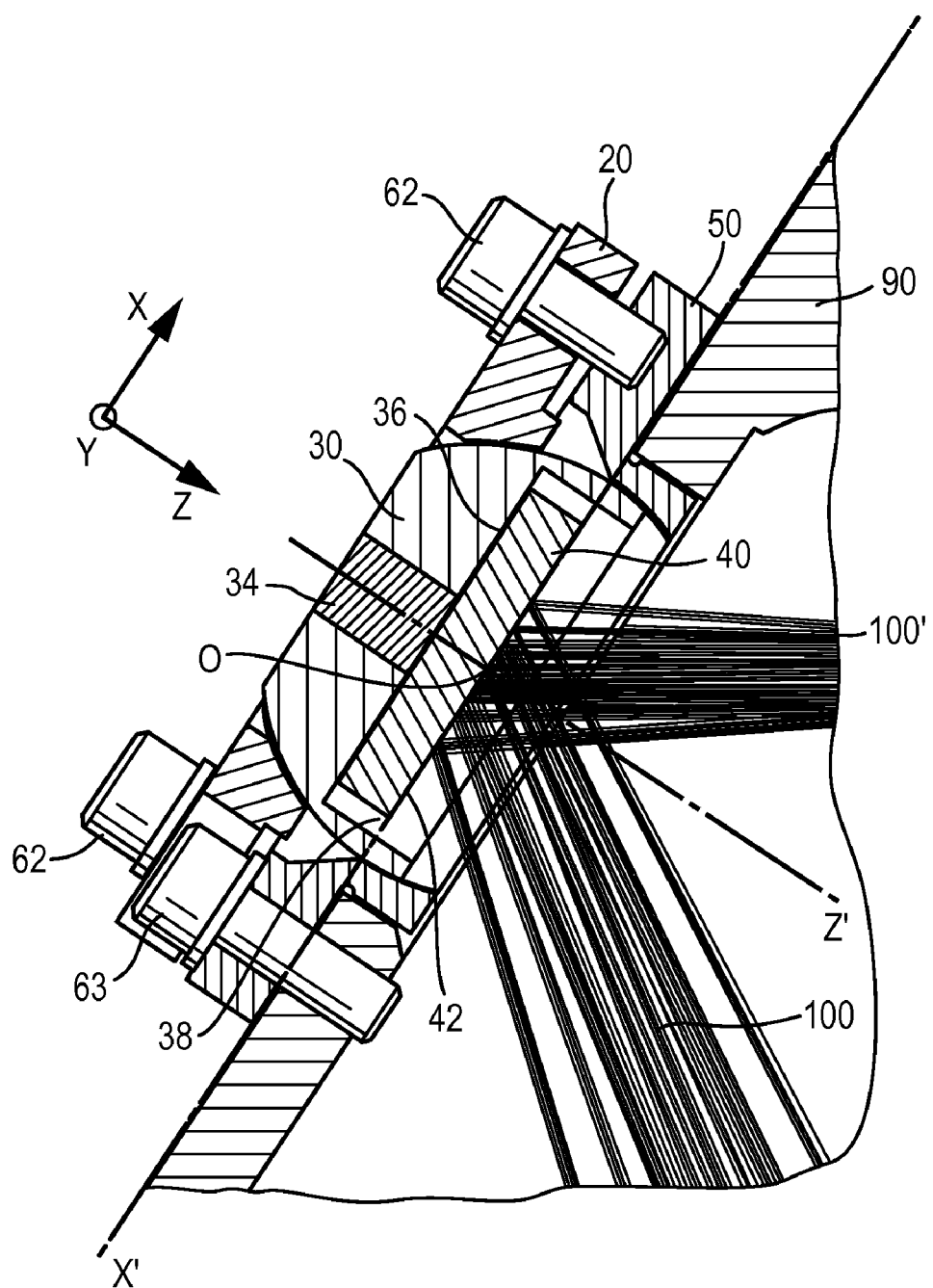
FIG. 5 shows a cross-sectional view taken along line I-I in FIG. 4 showing the spherical mount assembly mounted in the housing.

FIG. 5 shows a cross-sectional view taken along line I-I in FIG. 4 showing spherical mount assembly 10 mounted in housing 90.

A point O coincides with the center of rotation of spherical element 40. Three perpendicular axes, X', Y' and Z', may be defined with respect to spherical element 40 that meet at point O. When spherical element 40 is adjusted the three perpendicular axes, X', Y' and Z' will change relative to three-dimensional space. While a Cartesian coordinate system is shown, it will be appreciated that a spherical coordinate system may similarly be used.

According to an embodiment, optical surface 42 of the optical element 40 is positioned such that it is substantially coincides with the center of rotation of spherical element 30 at point O. In this configuration, alignment of spherical element 30 does not affect the depth of focus of optical element 40. As such, the effective distance of the (reflected) light path does not substantially change in the X', Y' and Z' directions Moreover, the beam width of the (reflected) light does not substantially change due to alignment adjustments.

In one implementation, optical surface 42 is located on the X'Y' plane. Optical element 40 may be symmetrically mounted on the X'Y' plane relative to the Z' axis, although this need not be the case.

Figure 6:
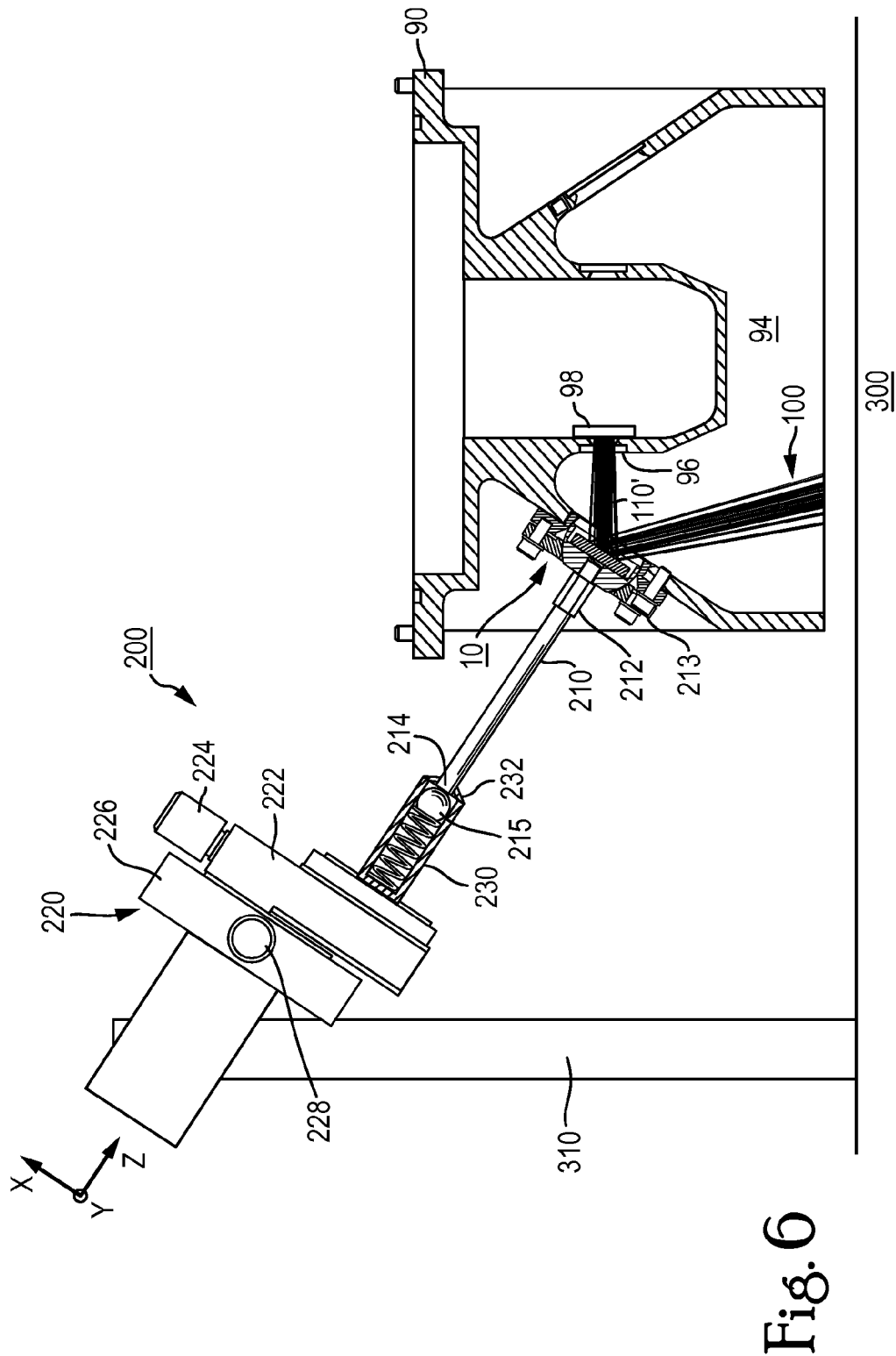
FIG. 6 shows an alignment system for aligning the optical element of the spherical mount assembly, according to an embodiment.

FIG. 6 shows alignment system 200 for aligning the optical element 40 of the assembly 10, according to an embodiment.

Housing 90 may be located on rigid reference surface 300, such as, for example, an optical bench. Alignment system 200 may be located on mounting structure 310, such as a post, at a fixed position with respect to reference surface 300.

Illumination sources (not shown) project beams of light 100 toward assembly 10. Beams of light 100' are reflected off optical surface 42 of spherical mount assembly 10 and pass through transparent optical windows 96 in housing to corresponding detectors 98. In one implementation, two detector elements may be used to measure one or more beams of light 100' reflected off each spherical mount assembly 10. Detectors 98 may be maintained in a vacuum environment.

Alignment system 200 may include alignment stem 210 and alignment stage 220. In some implementations, alignment stem 210 may be connected to alignment stage by coupling 230.

Alignment stage 220 may be a dual translation stage comprising first translation stage 222 and second translation stage 226.

First translation stage 222 may provide translational motion in the X direction which creates a corresponding $R_X$ (pitch) motion at spherical element 30 of assembly 10. First finger knob 224 may be provided on the first translation stage so that a person can manually control the translation of first translation stage 220. In one implementation, first finger knob 222 is connected to ball screw having 80 threads per inch, for example.

Second translation stage 226 may provide translation motion in the Y direction which creates a corresponding $R_y$ (yaw), motion at spherical element 30 of assembly 10. Second finger knob 228 (similar to first finger knob 224) may be provided on second translation stage 226 so that a person can manually control the translation of second translation stage 226.

In some implementations, an additional mechanism (not shown), such as a rotary actuator, may be provided to alignment stage 220 to provide a corresponding $R_Z$ (roll) motion at assembly 10. If so, alignment stem 210 may be rotationally fixed to a rotation stage, While roll motion may not be ordinary necessary for adjusting a flat mirror, for other optical elements, such as polarizer and filters, this arrangement may be more advantageous.

First translation stage 222 may be connected to second translation stage 224, which in turn is connected to mounting structure 310 (i.e., a nested structure) to provide alignment stage 220 with a single output at coupling 230. With this configuration, each of the rotational axes may be independently adjusted with alignment stage 220. It will be appreciated that other configurations are also possible. For example, rotary devices, such as rotary steppers, could be used as an alternative for positioning optical element 40 in assembly 10.

Alignment stem 210 may include a generally elongated member including first end 212 and second end 214. First end 212 may include a mounting portion 213 for engaging bore 34 of the spherical element 30. This may be a threaded connection. Other connection means are also possible, such as, for example, a bayonet joint. Second end 214 of alignment stem 210 may include spherical member 215. Spherical member 215 may be welded or threaded to alignment stem 210. Spherical member 215 permits alignment stem 210 to rotate about the rotational axes with respect to coupling 230. As such, only rotational motion may be transferred to spherical mounting assembly 10.

Coupling 230 connects stem 210 to alignment stage 220. Coupling 230 may be a generally cylindrical hollow element. Coupling 230 may include seat 232 that holds spherical element 232 in place and compression spring 234 may be provided inside coupling 230 to urge spherical element 215 against seat 230. In another implementation (not shown), coupling 230 may include a spherical member and the stem may include a socket for engaging the spherical member.

Control of the translation stages may be manually performed, for example, using finger knobs 224, 226. In one implementation, stem 210 may be 1.725 inches With this configuration, 1 full turn of the finger knob connected to a ball screw having 80 threads per inch will result in a 7.25 milliradians of rotation of spherical element 30.

It will be appreciated that, the longer the stem, the higher resolution that may be realized. The inventors have found that alignment system 200 of this disclosure, may provide for resolution of adjustment of approximately ±1 mils.

Figure 7:
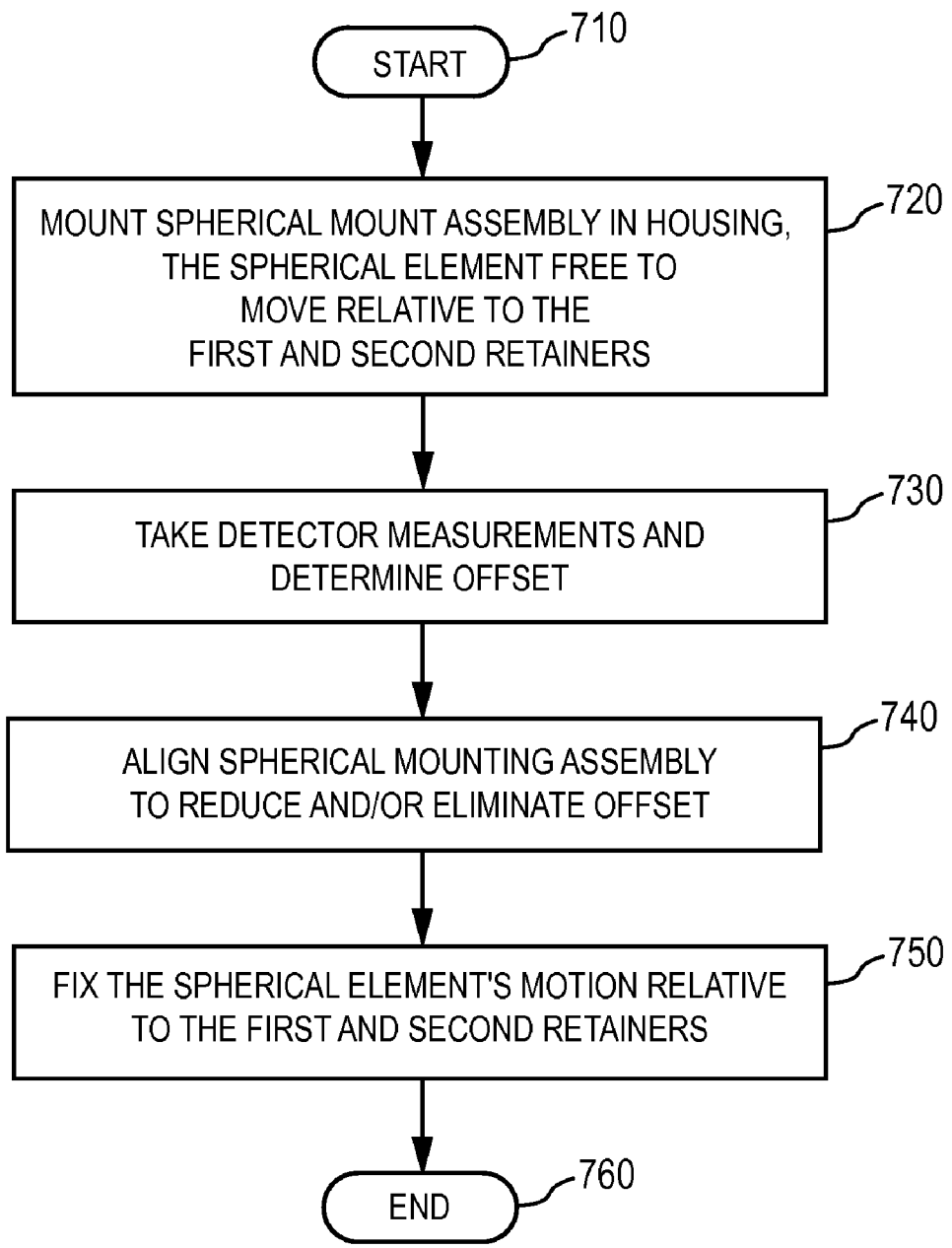
FIG. 7 shows an alignment method, according to an embodiment.

FIG. 7 provides a flowchart of alignment method 700, according to an embodiment. The method begins in step 710.

In step 720, spherical mount assembly 10 may be located in housing 90. Fasteners 62 may be loosened such that spherical element 30 can rotate relative to first retainer 20 and second retainer 50. In some implementations, a mock-up or test apparatus (simulating the mounting of assembly in the housing) may be similar used.

Continuing on to step 730, an illumination source projects a beam of light toward the optical element. Reflected light from the optical element is directed toward the measurement detector. The detector measurement may be analyzed to determine an offset.

Next in step 740, the spherical mounting assembly is aligned to reduce and/or eliminate the offset. The alignment may be manually and/or automatically controlled. In one implementation, a person may watch the detector's response and manually adjust the finger knobs of the translation stage to position the beam of light optimally of the detector.

In another implementation, each of translation stages 222, 226 may be positioned automatically using suitable motors, such as for example, linear stepper motors. A solenoid may also be used. A controller may be provided to generate control signals for the motors using feedback or feedforward signals from the detector, and the motors controlled in response thereto.

Alignment of spherical mounting assembly 10 may also be dynamically controlled. This may be advantageous for applications where optical element 40 is likely to become misaligned frequently (due to vibrations or other causes). For example, an automatic alignment system may remain connected to spherical mounting assembly 10 to provide on-going real-time alignment.

In step 750, when alignment of optical element 40 is completed, fasteners 62 may be tightened to so that tapered surfaces 22, 52 of first and second retainers 20, 50 are urged against spherical element 30 to clamp spherical element 30 and fix its position relative to assembly 10. A slight pre-load (torque) on fasteners 62 may ensure proper clamping. Alternatively or additionally, first retainer 20 can be staked to permanently fix the relative position of spherical element 30 thereto. The method ends in step 760.

Spherical mount assembly 10 disclosed herein may have applications for mounting various optical elements, especially where precise alignment is necessary.

Although various aspects have been described in detail for the purpose of illustration based on what is currently considered to be a variety of useful embodiments, it is to be understood that such detail is solely for that purpose and that the inventive concept is not limited to the disclosed embodiments, but, on the contrary, is intended to cover modifications and equivalent arrangements that are within the spirit and scope of the appended claims.

We claim:

1. A spherical mount assembly for mounting an optical element, comprising:
   a spherical element;

an optical element positioned relative to the spherical element, wherein an optical surface of the optical element is positioned to coincide with a center of rotation of the spherical element;

a first retainer including a first flange having a plurality of first through-holes for receiving a plurality of fasteners; and a second retainer including a second flange being parallel to the first flange and having a plurality of second through-holes aligned with the first through-holes for receiving the fasteners, a mounting surface configured to mount the spherical mount assembly to an external structure, and an orifice that is substantially parallel to the mounting surface, wherein the spherical element is configured to be positioned such that substantially all light impinging on the optical element enters and exits substantially through the orifice, and the first flange and the second flange are configured to receive the plurality of fasteners, which when the fasteners are tightened, draw the first and the second retainers toward each other, without rotation therebetween, to hold the spherical element captive in a fixed position, wherein each of the first retainer and the second retainer includes an interior curved surface having a radius that substantially corresponds to an outer radius of the spherical element.

2. The assembly according to claim 1, wherein the second retainer includes a circular projection forwardly extending from the mounting surface, the projection surrounding the orifice.

3. The assembly according to claim 1, wherein the spherical element includes a recess for locating the optical element.

4. The assembly according to claim 1, wherein the spherical element includes a threaded bore.

5. The assembly according to claim 1, wherein the optical element comprises a mirror, the mirror having a reflective surface selected from the group consisting of: a flat surface, a concave surface, and a convex surface.

6. An alignment system for a spherical mount assembly according to claim 1, the system comprising:
a stem including one end for cooperating with the spherical element of the spherical mount assembly and another end for cooperating with a spherical member;
a translation stage for generating translation motion; and
a coupling positioned between the translation stage and the stem that engages the spherical member and is configured to rotationally couple the translation stage to the stem without transferring translational motion to the spherical mount assembly.

7. The system according to claim 6, wherein the translation stage comprises:
a first translation stage for generating a first translation motion; and a second translation stage for generating a second translation motion, the second translation motion being orthogonal to the first translation motion.

8. The system according to claim 7, wherein the translation stage further comprises:
a third translation stage for generating a third second translation motion, the third translation motion being orthogonal to the first translation motion and the second translation motion.

9. The system according to claim 6, wherein one end of the stem includes threads for removably attaching to and deattaching from the spherical element of the spherical mount assembly.

10. The system according to claim 6, wherein either the coupling or the translation stage includes the spherical member.

11. The system according to claim 6, wherein the coupling includes a seat which the spherical member engages.

12. The system according to claim 11, further comprising a compression spring positioned within the coupling which urges the spherical member against the seat.

13. An alignment method for the spherical mount assembly according to claim 1 in a housing, the method comprising:
locating the spherical mount assembly in the housing;
coupling, to the spherical mount assembly, a stem including one end for cooperating with the spherical element of the spherical mount assembly and another end for cooperating with a spherical member;
providing, with a translation stage, a translational motion;
converting the translation motion into a rotational motion via the spherical member; and
transferring only the rotational motion to the spherical element of the spherical mount assembly.

14. The method according to claim 13, wherein said providing translational motion comprises turning one or more knobs of the translation stage.

15. The method according to claim 13, further comprising providing a controller arranged to automatically adjust a position of the spherical element relative to the spherical mount assembly.

16. The method according to claim 15, wherein the controller dynamically adjusts the position of the spherical element relative to the spherical mount assembly.

17. The method according to claim 13, wherein after the spherical element is aligned, the method further comprises permanently fixing the position of the spherical element with respect to the first retainer.

18. The method according to claim 13, wherein after the spherical element is aligned, the method further comprises removing the stem from the spherical element.

19. The assembly according to claim 1, wherein the plurality of fasteners included screw threads which engage corresponding screw threads of the first through-holes, the second through-holes, or both.

20. The assembly according to claim 1, wherein the spherical element defines an axis, and a plane defined by the optical element is substantially orthogonal to said axis.

* * * * *